(12) United States Patent
Nakamura

(10) Patent No.: US 6,727,900 B1
(45) Date of Patent: Apr. 27, 2004

(54) SEMICONDUCTOR INTEGRATED CIRCUIT DEVICE

(75) Inventor: Hisashi Nakamura, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/530,777

(22) PCT Filed: Sep. 7, 1998

(86) PCT No.: PCT/JP98/04024

§ 371 (c)(1),
(2), (4) Date: May 5, 2000

(87) PCT Pub. No.: WO00/14683

PCT Pub. Date: Mar. 16, 2000

(51) Int. Cl.[7] .................................................. G06T 15/40
(52) U.S. Cl. .................................................... 345/422
(58) Field of Search .............................. 345/422, 419, 345/420, 421, 423, 424

(56) References Cited

U.S. PATENT DOCUMENTS

| | | | | |
|---|---|---|---|---|
| 4,924,414 A | * | 5/1990 | Ueda | 345/422 |
| 5,544,306 A | | 8/1996 | Deering et al. | |
| 5,673,422 A | | 9/1997 | Kawai et al. | |
| 5,933,156 A | * | 8/1999 | Margolin | 345/422 |
| 6,008,813 A | * | 12/1999 | Lauer et al. | 345/424 |
| 6,052,125 A | * | 4/2000 | Gardiner et al. | 345/421 |
| 6,084,599 A | * | 7/2000 | Nakatsuka et al. | 340/506 |
| 6,094,200 A | * | 7/2000 | Olsen et al. | 345/422 |
| 6,246,415 B1 | * | 6/2001 | Grossman et al. | 345/421 |
| 6,285,779 B1 | * | 9/2001 | Lapidous et al. | 345/422 |
| 6,310,620 B1 | * | 10/2001 | Lauer et al. | 345/424 |
| 6,313,839 B1 | * | 11/2001 | Larson | 345/422 |
| 6,348,919 B1 | * | 2/2002 | Murphy | 345/421 |
| 6,417,848 B1 | * | 7/2002 | Battle | 345/419 |
| 6,441,818 B1 | * | 8/2002 | Kurose | 345/422 |

FOREIGN PATENT DOCUMENTS

| | | |
|---|---|---|
| JP | 4-367988 | 12/1992 |
| JP | 7-249116 | 9/1995 |
| JP | 8-16797 | 1/1996 |
| JP | 8-161526 | 6/1996 |
| JP | 9-270024 | 10/1997 |
| JP | 9-282486 | 10/1997 |

OTHER PUBLICATIONS

"Three–Dimensional Frame Buffer Memory Integrated with Z–comparing/α–blending Unit", H. Matsuoka et al., IEICE Technical, IEICE, vol. 95, No. 72, May 26, 1995, pp. 31–39.
"Three–dimensional Graphics Frame Buffer Memory (3D–RAM)", Nakamura et al., Mitsubishi Electronics Technological Review, vol. 69, No. 3, 1995, pp. 42–46.

* cited by examiner

*Primary Examiner*—Mark Zimmerman
*Assistant Examiner*—Enrique L Santiago
(74) *Attorney, Agent, or Firm*—McDermott, Will & Emery

(57) ABSTRACT

In a frame buffer memory including a DRAM (11), an SRAM (12) functioning as a cache memory, and a comparison unit (17) comparing depth data stored in the SRAM (12) and depth data input from an external source and writing depth data input from the external source directly to the SRAM (12) when depth data input from the external source represents a shallower point on a screen, a maxZ detection circuit (27) detecting depth data representing a deepest point among depth data of eight pixels stored in each memory block (18) of SRAM (12) is provided. The detection circuit (27) does not compare depth data of each pixel as comparison unit (17) but detects depth data representing a deepest point among depth data of eight pixels, whereby a Z buffering process is sped up.

3 Claims, 7 Drawing Sheets

US 6,727,900 B1

SEMICONDUCTOR INTEGRATED CIRCUIT DEVICE

TECHNICAL FIELD

The present invention relates generally to a semiconductor integrated circuit device, and more particularly to a semiconductor integrated circuit device provided with a memory and a three-dimensional graphics processing circuit.

BACKGROUND ART

The Z buffering process is a typical example of the hidden surface removal process for a three-dimensional graphics. According to this process, each pixel is made to have a distance (Z value: depth data) from an eye point, Z values are compared during depiction, and only a shallowest pixel (having a smallest Z value) is displayed among a plurality of pixels having the same coordinate. According to this process, a shallowest image on a screen is preferentially displayed and an image hidden behind the shallowest image is not displayed.

Currently, a three-dimensional graphics frame buffer memory including a necessary circuit for such Z buffering process together with a memory on one chip has been provided. Details of the memory are disclosed in U.S. Pat. No. 5,673,422 (Japanese Patent Laying-Open No. 7-249116); Nakamura, Inoue and Kawai, 'Three-dimensional Graphics Frame Buffer Memory (3D-RAM)', Mitsubishi Electronics Technological Review, Vol. 69, No. 3, 1995, pp42–46; and U.S. Pat. No. 5,544,306.

The frame buffer memory includes a comparison unit comparing a Z value supplied from an external source for a new image and a Z value already stored in the memory for a current image, and thereby allows Mostly-Write operation instead of Read-Modify-Write operation in which a Z value of a currently displayed image is read from the memory and compared with a Z value of a new image whenever the new image is to be displayed, and data of a shallower image is written into the memory.

Even such frame buffer memory with the comparison unit, however, takes a long time for the Z buffering process because a Z value must be input from an external source for each pixel. In addition, when the Z value supplied from the external source indicates a deep point on a screen, the input of such Z value is useless because the Z value will not be stored in the memory after all.

DISCLOSURE OF INVENTION

An object of the present invention is to provide a semiconductor integrated circuit device capable of a high-speed Z buffering processing.

The semiconductor integrated circuit device according to the present invention includes a memory and a detection circuit. The memory stores depth data of each of pixels forming a three-dimensional graphics image. The detection circuit detects depth data representing a deepest point on the three-dimensional graphics image among depth data stored in a predetermined region of the memory for a plurality of pixels.

Preferably, the semiconductor integrated circuit device further includes a terminal for supplying the depth data detected by the detection circuit as an output from the device.

Hence, a main advantage of the present invention lies in that the Z buffering process can be performed faster than in a case where depth data is compared for each pixel, because depth data representing a deepest point among depth data for the plurality of pixels is detected.

Further, another advantage of the present invention is that input of data other than depth data eventually written into the memory are prevented and a useless input of depth data can be avoided because depth data representing a deepest point is detected and supplied as an output from the device.

BEST MODE FOR CARRYING OUT THE INVENTION

Figure 1:
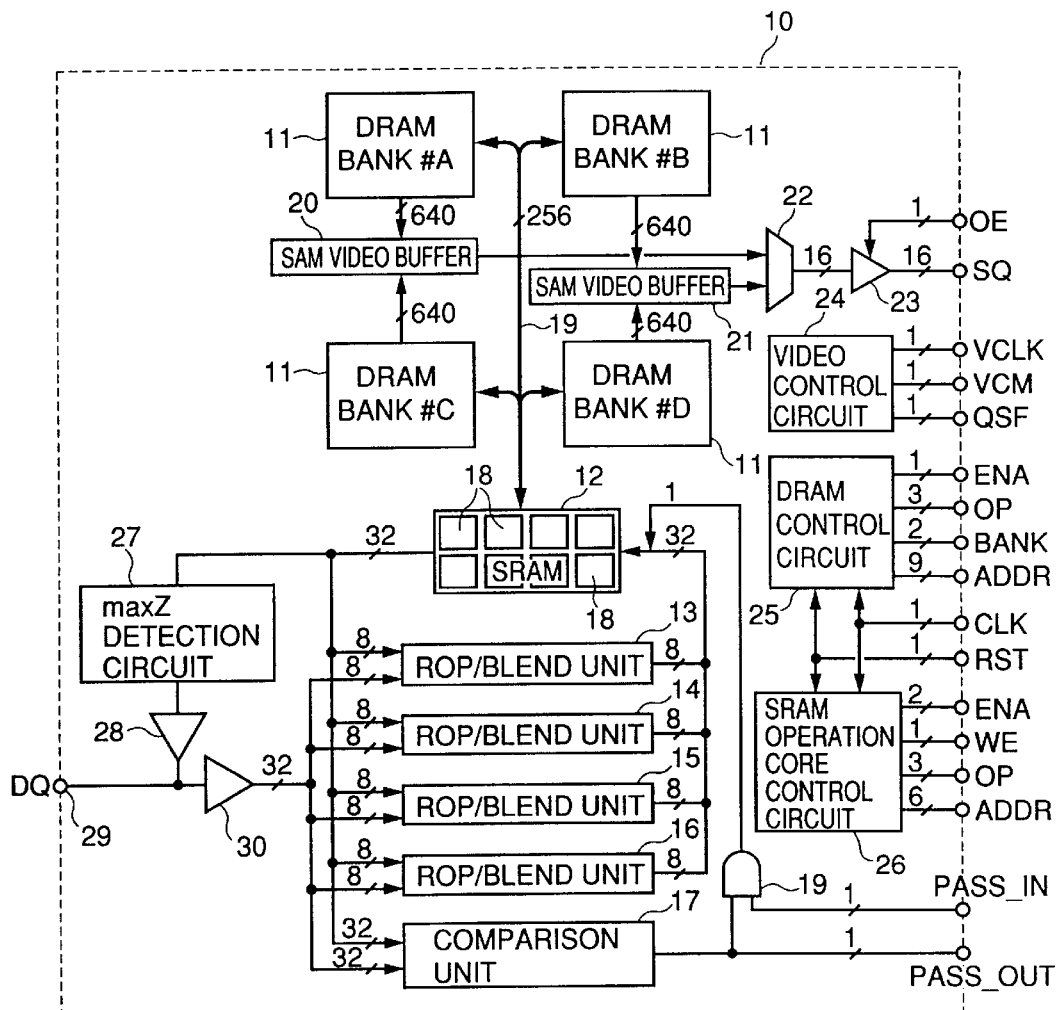
FIG. 1 is a block diagram showing an overall structure of a frame buffer memory according to a first embodiment of the present invention.

Embodiments of the present invention will be described in detail hereinafter with reference to the drawings. In the drawings, the same or a corresponding portion will be denoted by the same reference character and the description thereof will not be repeated.

First Embodiment

With reference to FIG. 1, a three-dimensional graphics frame buffer memory 10 according to the first embodiment of the present invention includes, as a main part, a dynamic random access memory (DRAM) 11, a static random access memory (SRAM) 12, a raster operation (ROP)/blend units 13–16 and a comparison unit 17.

DRAM 11 functions as a main memory and is divided into four banks #A, #B, #C, and #D. Each bank has (512×640×8) memory cells (not shown) and is capable of recording 2.6-M bit data. Hence, the total storage capacity of DRAM 11 as a whole is 10.5 M bits. In the first embodiment, depth data of each of pixels forming the three-dimensional graphics image is stored in DRAM 11.

SRAM 12 functions as a cache memory of DRAM 11 and is divided into eight memory blocks 18. Each memory block 18 has a storage capacity of 256 bits. Therefore, the storage capacity of SRAM 12 as a whole is 2 K bits.

A 256-bit global bus 19 is provided between DRAM 11 and SRAM 12. Global bus 19 simultaneously transfers 256-bit data from DRAM 11 to SRAM 12 and simultaneously transfers 256-bit data from SRAM 12 to DRAM 11. Therefore, in SRAM 12, data reading and writing are performed per 256-bit memory block 18.

ROP/blend units 13–16 perform a predetermined operation process based on 32-bit data supplied from SRAM 12 and 32-bit data DQ supplied from an external source. To be specific, each of ROP/blend units 13–16 performs a raster operation process or an a blending process based on 8-bit data from SRAM 12 and 8-bit data DQ from an external source. Here, in the first embodiment, ROP/blend units 13–16 supply data DQ supplied from an external source as it is to SRAM 12 because frame buffer memory 10 is employed solely for an operation process of the Z value. Comparison unit 17 compares 32-bit data supplied from SRAM 18 with 32-bit data DQ supplied from an external source and supplies a comparison result signal PASS_OUT as an output from the device and to an AND gate 19. AND gate 19 has another input receiving a comparison result signal PASS_IN from an external source. When AND gate 19 outputs a signal at an H (logical high) level, 32-bit data DQ passed through ROP/blend units 13–16 is written to SRAM 12.

Frame buffer memory 10 further includes serial access memory (SAM) video buffers 20 and 21 supplying data stored in DRAM 11 for image display in a form of 16-bit sequential data SQ as an output from the device. Video buffer 20 simultaneously reads 640-bit data from bank #A or #C of DRAM 11. Video buffer 21 simultaneously reads 640-bit data from bank #B or #D of DRAM 11. Data from video buffers 20 and 21 are alternately selected by a multiplexer 22 and the selected data is output as sequential data SQ via a buffer 23. Buffer 23 is activated in response to an output enable signal OE. Here, in the first embodiment, video buffers 20 and 21 do not operate, because frame buffer memory 10 according to the first embodiment is employed solely for the Z value processing.

Frame buffer memory 10 further includes a video control circuit 24, a DRAM control circuit 25 and an SRAM operation core control circuit 26. Video control circuit 24 controls video buffers 20 and 21 and multiplexer 22 in response to a clock signal VCLK, control signals VCM and QSF. DRAM control circuit 25 controls DRAM 11 in response to an enable signal ENA, a bank signal BANK, an address signal ADDR, and a control signal OP. SRAM operation core control circuit 26 controls SRAM 12 and ROP/blend units 13–16 in response to an enable signal ENA, a write enable signal WE, an address signal ADDR and a control signal OP. Control circuits 25 and 26 operate in response to a clock signal CLK and are reset in response to a reset signal RST.

Generally, one pixel is represented by 96- to 128-bit data (including RGB of 8 bits each, α blending ratio of 8 bits, Z value of 32 bits, stencil of 8 bits, window ID of 8 bits, overlay of 8 bits and so on). As frame buffer memory 10 according to the first embodiment is employed solely for the Z value processing, each of memory blocks 18 of SRAM 12 stores Z values of eight pixels (256 bits=8 pixels×32 bits).

Frame buffer memory 10 further includes a maxZ detection circuit 27 detecting a largest Z value representing a deepest point on a screen among Z values of eight pixels stored in each block 18 of SRAM 12. The largest Z value detected by detection circuit 27 is supplied via a buffer 28 and an input/output terminal 29 as an output from the device.

Data DQ is input to ROP/blend units 13–16 or comparison unit 17 via input/output terminal 29 and a buffer 30. Buffers 28 and 30 are selectively activated. Thus, input/output terminal 29 is employed not only for the input of data DQ to ROP/blend units 13–16 or comparison unit 17 but also for the output of the largest Z value.

Next, an operation of frame buffer memory 10 having the structure as described above will be described.

Figure 3:
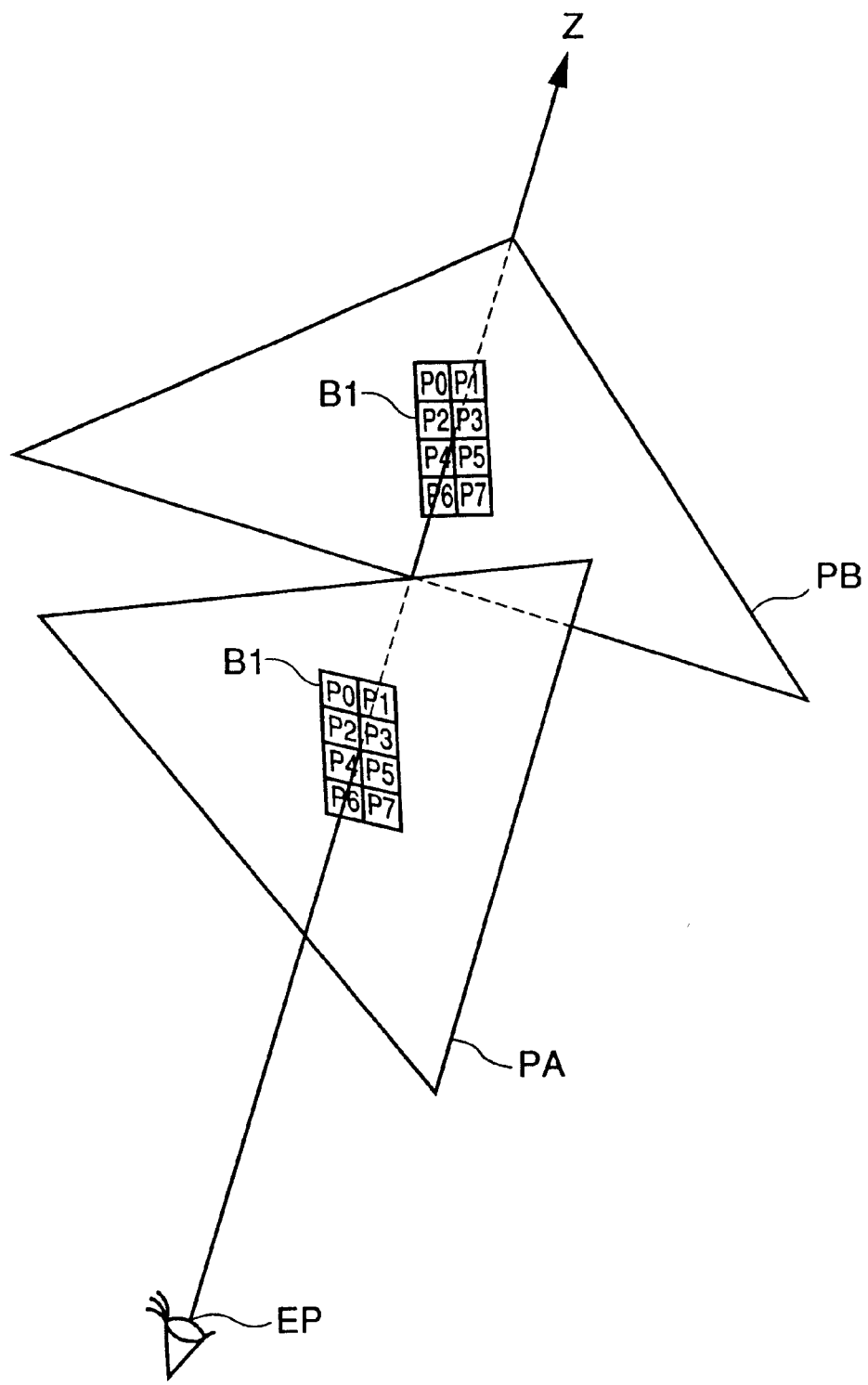
FIG. 3 is a perspective view of an image shown in FIG. 2.

Here, assume that an image of a polygon PA is first displayed, and then a polygon PB located at a deeper position than polygon PA will be displayed. DRAM 11 of frame buffer memory 10 stores a Z value for the display of such image. The Z value is depth data and is defined as a distance between an eye point EP and an image as shown in FIG. 3. The Z value is given for each pixel. At first, a Z value of each pixel in polygon PA is stored in DRAM 11. A block B1 in polygon PA is located in front of a corresponding block B1 in polygon PB. Hence, even if the Z values of block B1 in polygon PB are input to frame buffer memory 10 and compared with the Z values of block B1 in polygon PA stored in SRAM 12 in comparison unit 17, the Z values of block B1 in polygon PB will not be written to SRAM 12. Therefore, the input of the Z values of block B1 in polygon PB is useless.

Hence, the largest Z value among Z values of block B1 in polygon PA is detected by maxZ detection circuit 27. Here, one block B is constituted of eight (=4×2) pixels P0–P7. Z values of these eight pixels are 256 bits (=eight pixels×32 bits). The Z values of these eight pixels are a unit of transfer from DRAM 11 to SRAM 12 and stored in one of memory blocks 18 of SRAM 12.

The Z values of eight pixels P0–P7 stored in each memory block 18 of SRAM 12 are read by maxZ detection circuit 27. Then, a largest Z value is detected by maxZ detection circuit 27 from Z values of eight pixels P0–P7 and supplied via input/output terminal 29 as an output from the device.

When all Z values of eight pixels P0–P7 of block B1 in polygon PB are larger than the detected largest Z value, Z values of eight pixels P0–P7 of block B1 in polygon PB would not be written to SRAM 12 even if the Z values are input to frame buffer memory 10. Therefore, Z values of eight pixels P0–P7 in polygon PB are not input to frame buffer memory 10.

On the other hand, Z values of eight pixels of a block B2 are input to frame buffer memory 10 because block B2 in polygon PB is not concealed by polygon PA.

Figure 4:
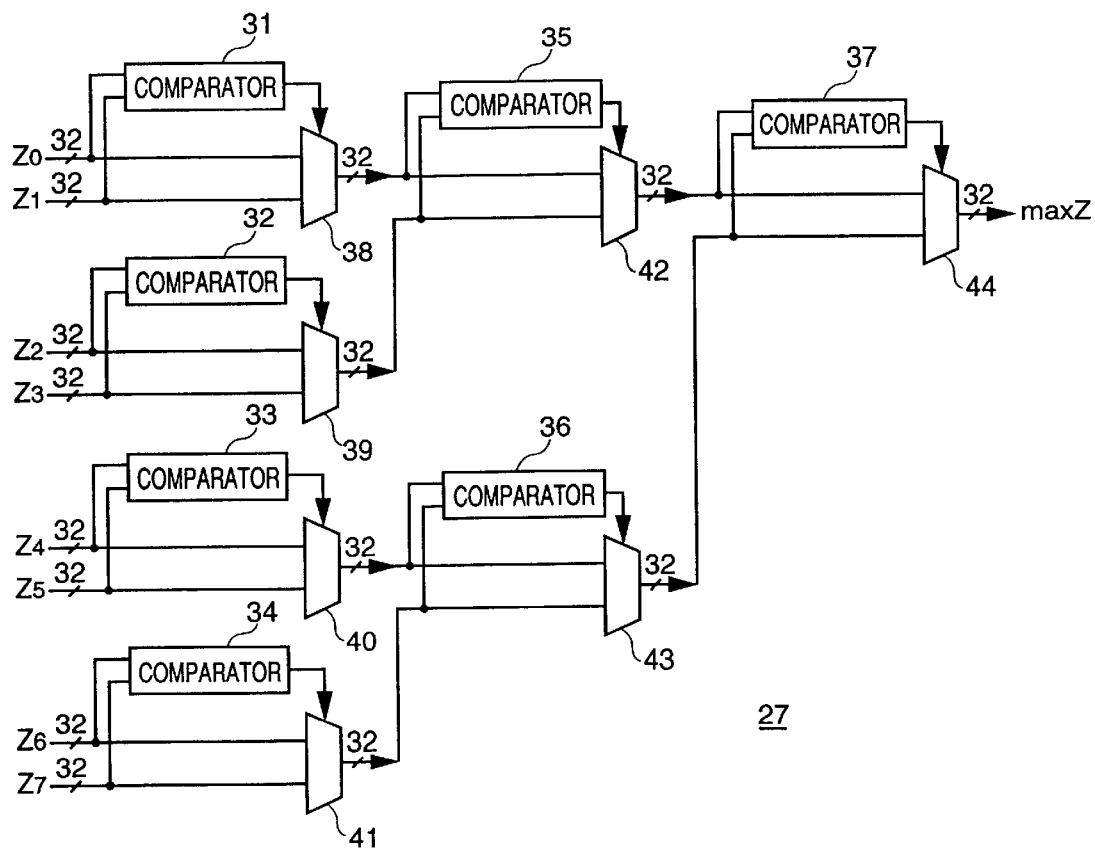
FIG. 4 is a block diagram showing a structure of a maxZ detection circuit shown in FIG. 1.

Here, maxZ detection circuit 27 includes comparators 31–37 and selectors 38–44 as shown in FIG. 4. Here, maxZ detection circuit 27 detects a largest Z value from Z values Z0–Z7 of eight pixels by tournament system.

More specifically, comparator 31 compares Z value Z0 with Z value Z1, and selector 38 selects the larger Z value based on the comparison result. Comparator 32 compares Z value Z2 with Z value Z3, and selector 39 selects the larger Z value based on the comparison result. Comparator 33 compares Z value Z4 with Z value Z5, and selector 40 selects the larger Z value based on the comparison result. Comparator 34 compares Z value Z6 with Z value Z7, and selector 41 selects the larger Z value based on the comparison result. Comparator 35 compares two Z values selected by selectors 38 and 39, respectively, and selector 42 selects the larger Z value based on the comparison result. Comparator 36 compares two Z values selected by selectors 40 and 41, respectively, and selector 43 selects the larger Z value based on the comparison result. Comparator 37 compares two Z values selected by selectors 42 and 43, respectively, and selector 44 selects the larger Z value based on the comparison result. The Z value selected by selector 44 is the largest Z value among Z values Z0–Z7.

Thus, according to the first embodiment, comparison unit 17 needs not determine for each pixel whether a Z value should be written to SRAM 12 or not, because maxZ detection circuit 27 detects the largest Z value among Z values of eight pixels stored in each memory block 18 of SRAM 12. Thus, frame buffer memory 10 can perform the Z buffering processing at faster speed.

In addition, when all Z values of eight pixels to be input to frame buffer memory 10 via input/output terminal 29 are larger than the largest Z value, the Z values of eight pixels will not be input, because the largest Z value detected by maxZ detection circuit 27 is supplied as an output via input/output terminal 29. Therefore, a Z value which will not be written to SRAM 12 in effect are not input to frame buffer memory 10 uselessly.

In addition, as a Z value is detected according to a tournament system, a truly largest value is detected from Z values Z0–Z7 of eight pixels. Therefore, a useless input of Z value which will not be written to SRAM 12 in effect can be surely avoided.

Second Embodiment

Figure 5:
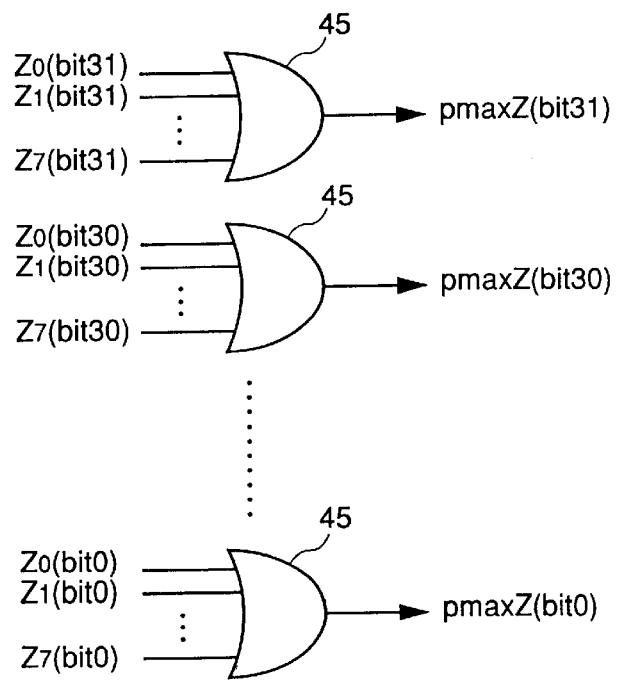
FIG. 5 is a circuit diagram showing a structure of a maxZ detection circuit in a frame buffer memory according to a second embodiment of the present invention.

As shown in FIG. 5, maxZ detection circuit 27 according to the second embodiment of the present invention includes 32 OR gates 45, which number is equal to the bit number of the Z value. Here, maxZ detection circuit 27 receives 256-bit (=32 bits×8 pixels) signal of Z values Z0–Z7 of eight pixels. More specifically, each OR gate 45 receives corresponding bit signals of Z values Z0–Z7 of eight pixels. Here, maxZ detection circuit 27 detects a pseudo largest Z value pmaxZ from Z values Z0–Z7 of eight pixels. Pseudo largest Z value pmaxZ does not correctly assume a largest value of Z values Z0–Z7 of eight pixels but always assumes a larger value than the correct largest value. Each OR gate 45 outputs a bit signal corresponding to pseudo largest Z value pmaxZ.

Thus, according to the second embodiment, the circuit scale is reduced compared with maxZ detection circuit 27 shown in FIG. 4, because maxZ detection circuit 27 is constituted of 32 OR gates 45. In addition, the speed-up of the Z buffering process can be achieved as in the first embodiment described above, because pseudo largest Z value pmaxZ detected in the second embodiment, though not a correct largest value, always assumes a value slightly larger than the correct largest value.

Third Embodiment

Figure 6:
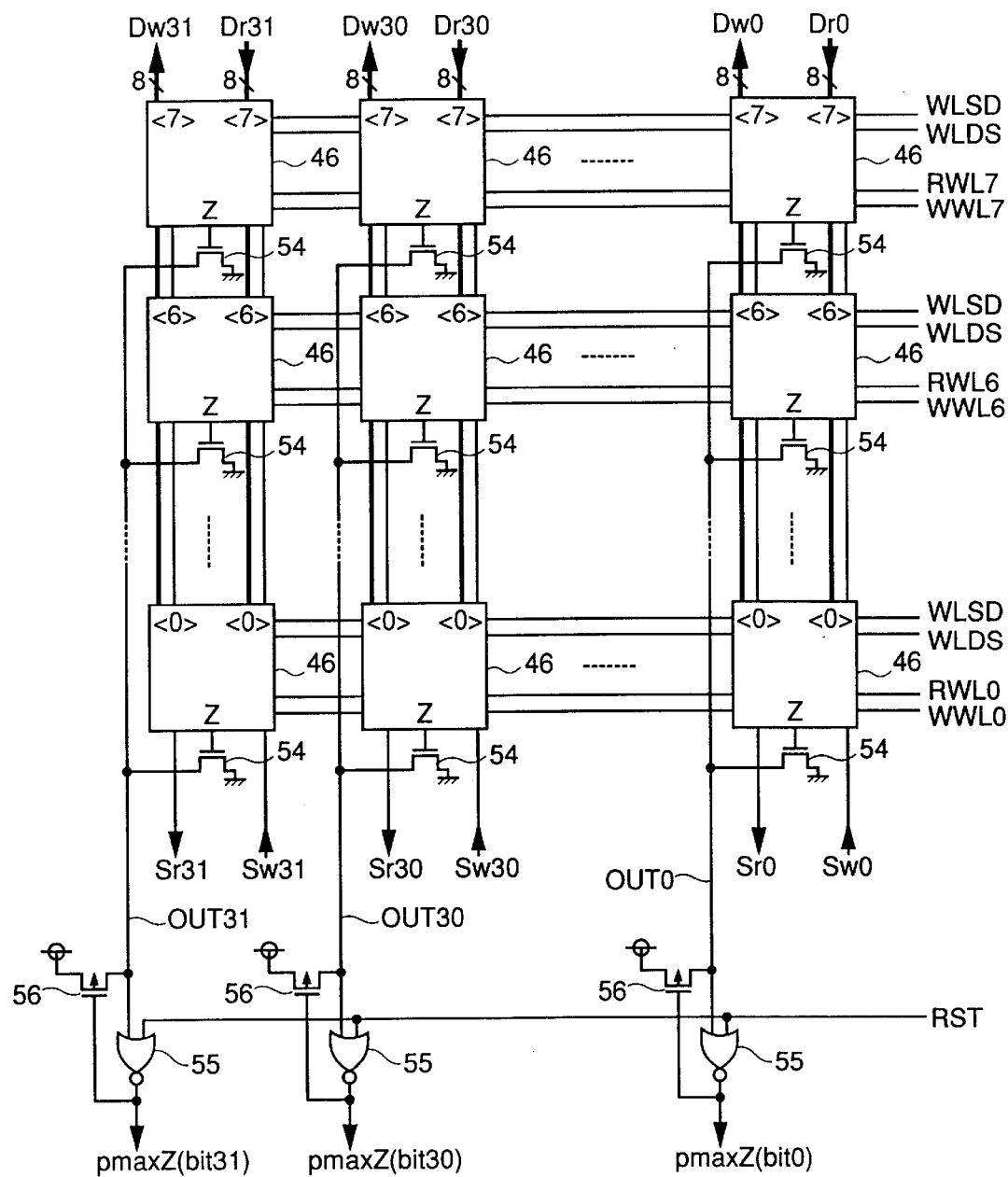
FIG. 6 is a block diagram showing a structure of an SRAM and a maxZ detection circuit in a frame buffer memory according to a third embodiment of the present invention.

As shown in FIG. 6, each block 18 of SRAM 12 includes 256 static memory cells 46 as a matrix of 8 rows by 32 columns. Thirty-two memory cells 46 arranged in each column store a 32-bit Z value of one pixel.

Figure 7:
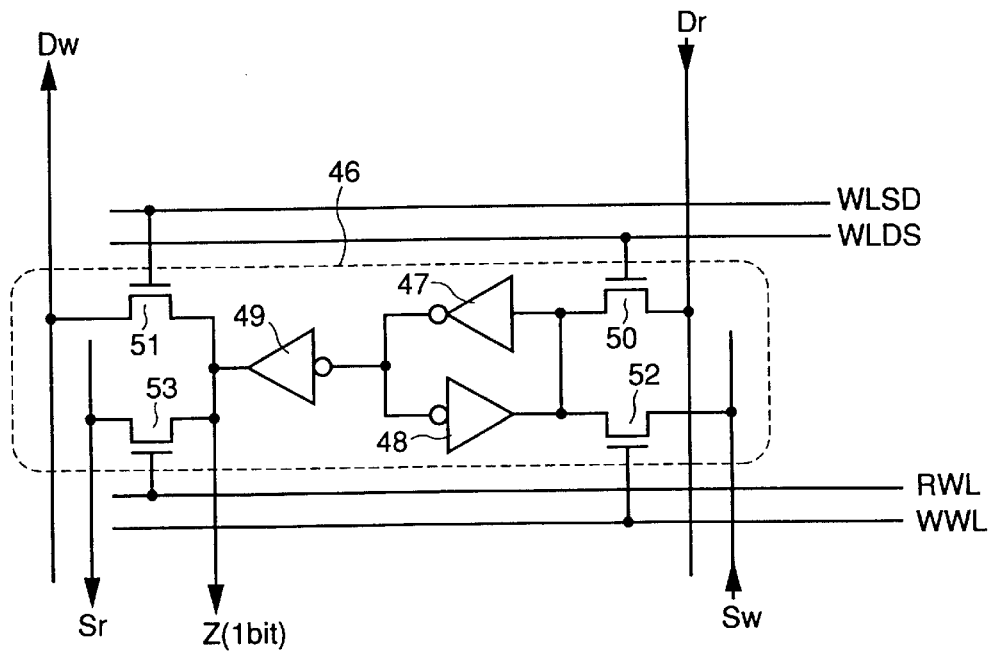
FIG. 7 is a circuit diagram showing a structure of each static memory cell shown in FIG. 6.

Each memory cell 46 includes inverters 47–49 and access transistors 50–53 as shown in FIG. 7. Inverters 47 and 48 constitute a latch circuit. A gate of access transistor 50 is connected to a word line WLDS. When word line WLDS rises, data Dr read from DRAM 11 is written to memory cell 46 via transistor 50. A gate of access transistor 51 is connected to a word line WLSD. When word line WLSD rises, data Dw is read from memory cell 46 via transistor 51 and written to DRAM 11. A gate of access transistor 52 is connected to a word line WWL. When word line WWL rises, data Sw from comparison unit 17 or ROP/blend units 13–16 is written to memory cell 46 via transistor 52. A gate of access transistor 53 is connected to a word line RWL. Therefore, when word line RWL rises, data Sr is read from memory cell 46 via transistor 53 and given to comparison unit 17 or ROP/blend units 13–16. Thus, each memory cell 46 has four input/output ports.

Word line WLDS is commonly connected to all of 256 memory cells 46 as shown in FIG. 6. Thus, data Dr0–Dr31 read from DRAM 11 and 8 bits each are simultaneously written to all memory cells 46. In addition, word line WLSD is commonly connected to all of 256 memory cells 46. Thus, data Dw0–Dw31 read from each memory cell 46 and of 8 bits each are simultaneously written to DRAM 11. Word lines WWL0–WWL7 are arranged to eight rows, respectively. Each of word lines WWL0–WWL7 are commonly connected to 32 memory cells 46 arranged in a corresponding row. Hence, when one word line of word lines WWL0–WWL7 rises, 32-bit data Sw0–Sw31 from comparison unit 17 or ROP/blend units 13–16 are written to corresponding 32 memory cells 46. Further, word lines RWL0–RWL7 are arranged to eight rows, respectively. Each of word lines RWL0–RWL7 is commonly connected to 32 memory cells 46 arranged to a corresponding row. Therefore, when one word line among RWL0–RWL7 rises, 32-bit data Sr0–Sr31 read from corresponding 32 memory cells 46 are given to comparison unit 17 or ROP/blend units 13–16.

In SRAM 12 according to the third embodiment of the present invention, an N channel MOS transistor 54 is provided corresponding to memory cell 46 and 32 lines of output lines OUT0–OUT31 are provided for 32 columns. Drains of eight transistors 54 arranged for each column are commonly connected with a corresponding output line and sources thereof are grounded. Output lines OUT0–OUT31 are connected to one inputs of 32 NOR gates 55, respectively. Another inputs of NOR gates 55 receive reset signal RST attaining an H level simultaneously with the rise of word line WLDS. Therefore, when data is transferred from DRAM 11 to SRAM 12, reset signal RST is turned to an H level and a P channel MOS transistor 56 is turned on. All output lines OUT0–OUT31 are precharged to a power supply voltage.

A gate of each transistor 54 receives a Z value signal output from inverter 49 in memory cell 46. Hence, if at least one memory cell 46 among eight memory cells 46 arranged at the right end column of FIG. 6 stores "1" (H level) data, for example, output lines OUT0–OUT31 are discharged to a ground voltage. Then, a signal of a 0th bit of a pseudo largest Z value pmaxZ(bit0) output from a corresponding NOR gate 55 attains "1" (H level). In other words, in the third embodiment, eight transistors 54 arranged for each column function equally to one OR gate 45 shown in FIG. 5.

Thus, according to the third embodiment, increase in the area occupied by maxZ detection circuit 27 can be suppressed because maxZ detection circuit 27 is embedded in SRAM 12 as transistor 54.

Fourth Embodiment

Figure 2:
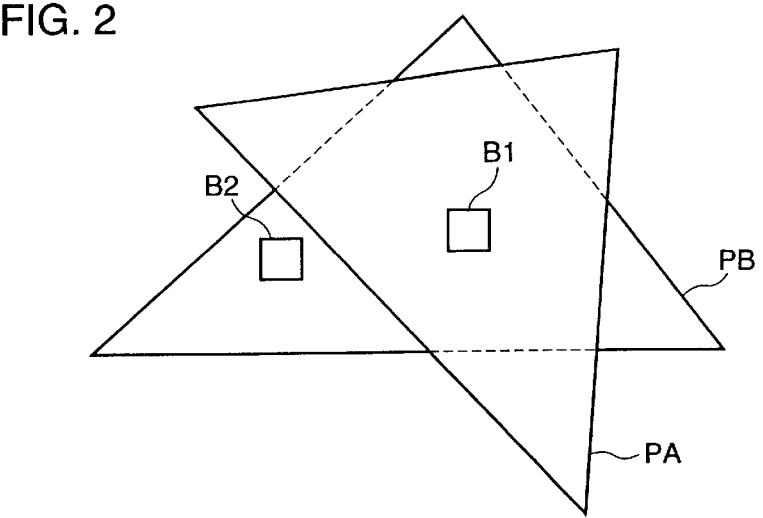
FIG. 2 is a front view of a three-dimensional graphics image to be processed by a frame buffer memory shown in FIG. 1.
Figure 8:
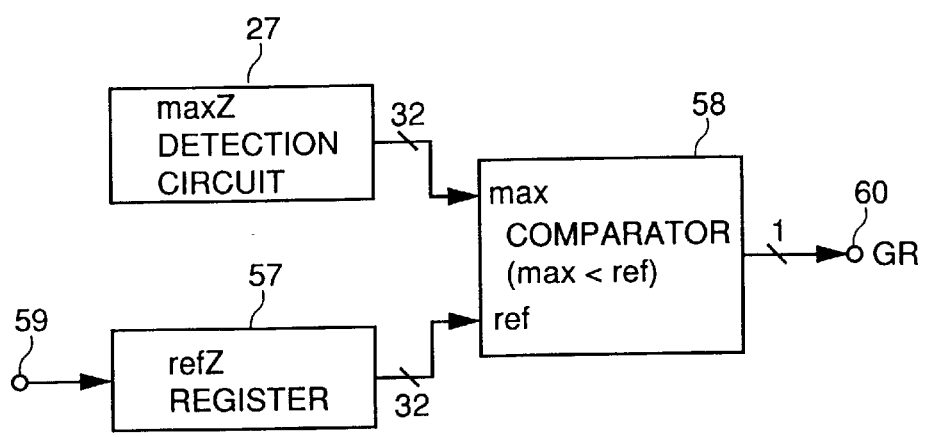
FIG. 8 is a block diagram showing a structure of a maxZ detection circuit, a refZ register, and a comparator in a frame buffer memory according to a fourth embodiment of the present invention.

A frame buffer memory according to the fourth embodiment of the present invention further includes a refZ register 57 and a comparator 58 besides maxZ detection circuit 27 as shown in FIG. 8. A smallest Z value representing a shallowest point on the screen among Z values of eight pixels to be next input as those of polygon PB shown in FIG. 2 is written via an input terminal 59. Comparator 58 compares a largest Z value or a pseudo largest Z value detected by maxZ detection circuit 27 with a smallest Z value registered in refZ register 57, and outputs the comparison result signal GR via an output terminal 60.

Thus in the fourth embodiment, the smallest Z value among the Z values of eight pixels to be next input is registered in refZ register 57 and the largest or the pseudo largest Z value detected by maxZ detection circuit 27 is compared with the registered smallest Z value by comparator 58, whereby such comparison process need not be performed outside the frame buffer memory. Therefore, the input of the Z values of the next eight pixels to the frame buffer memory is required only when the largest or the pseudo largest Z value detected by detection circuit 27 is smaller than the smallest Z value registered in register 57 based on comparison result signal GR output from comparator 58.

In the fourth embodiment, buffers 28 and 30 as shown in FIG. 1 are not required and output terminal 60 for supplying comparison result signal GR as an output can be provided separately from input/output terminal 29, because 32-bit largest or pseudo largest Z value is not supplied as an output from the device.

Here, input terminal 59 for inputting the 32-bit smallest Z value to register 57 can be provided separately from input/output terminal 29, but preferably is common to input/output terminal 29.

Fifth Embodiment

Though the frame buffer memory in first to fourth embodiments described above is employed solely for storing and processing the Z value, in some cases utility data attached to a pixel is stored together with the Z value in the frame buffer memory. When 32-bit utility data is stored in the frame buffer memory together with a 32-bit Z value, for example, the Z value is stored in memory cells 46 of an even-numbered row and the utility data is stored in memory cells 46 of an odd-numbered row in each memory block 18 of SRAM 12 shown in FIG. 6. In this case, memory cell 46 storing the utility data must be masked for the acquisition of a correct pseudo largest Z value.

Figure 9:
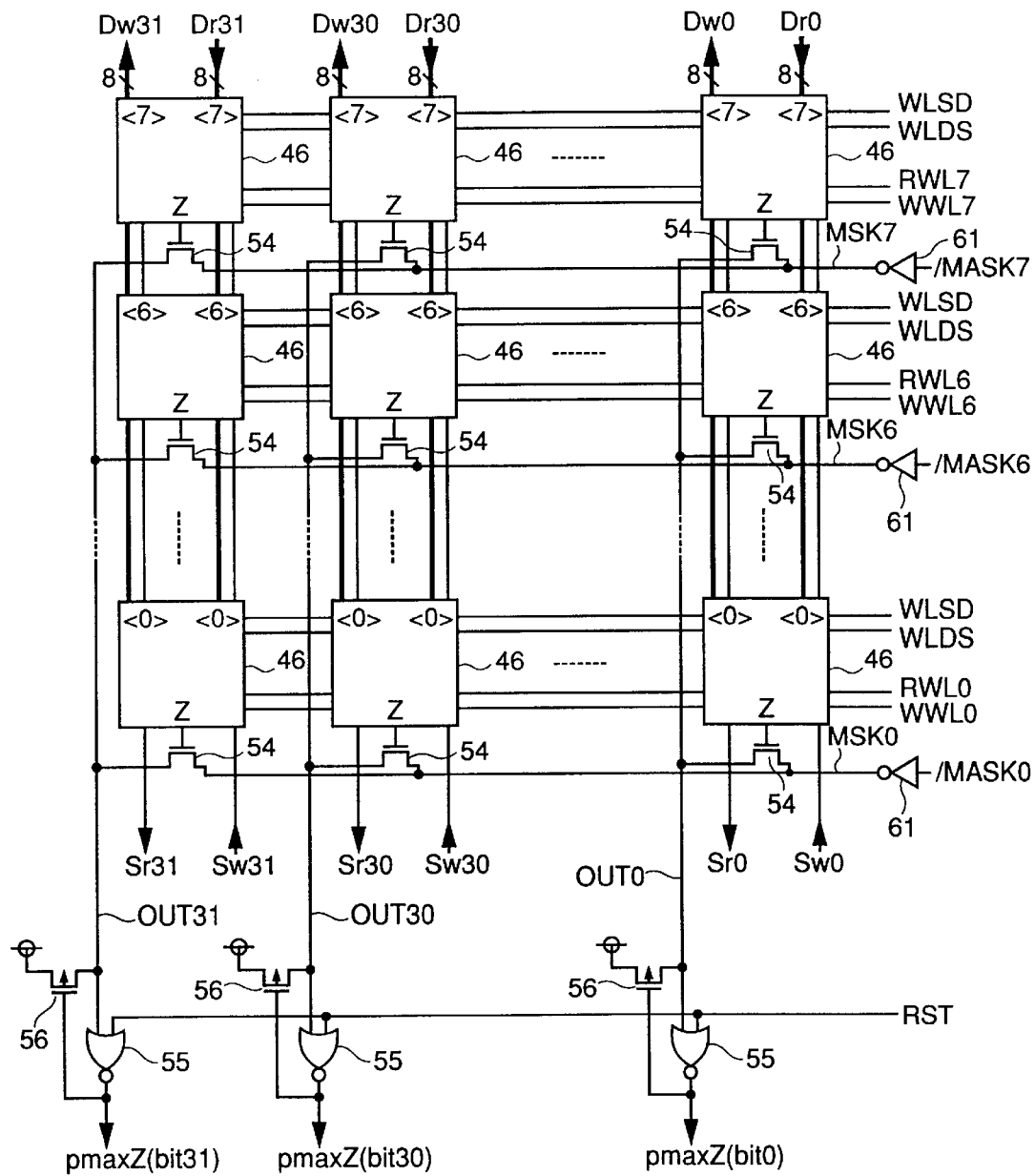
FIG. 9 is a block diagram showing a structure of an SRAM and a maxZ detection circuit in a frame buffer memory according to a fifth embodiment of the present invention.

In the fifth embodiment of the present invention, mask lines MSK0–MSK7 are arranged to eight rows, respectively, as shown in FIG. 9. Sources of transistors 54 arranged to each row are commonly connected to a corresponding mask line. In addition, an inverter 61 is provided corresponding to each of mask lines MSK0–MSK7. Inverters 61 receive mask signals /MASK0–/MASK7, respectively, and supply the output signals to mask lines MSK0–MSK7, respectively.

When the Z value is stored in memory cells 46 of the even-numbered row and the utility data is stored in memory cells 46 of the odd-numbered row, mask signals /MASK0, /MASK2, /MASK4, /MASK6 are turned to an H level and mask signals /MASK1, /MASK3, /MASK5, /MASK7 are turned to an L (logical low) level. Then, the sources of transistors 54 of the even-numbered row are grounded as in FIG. 6, whereas the sources of transistors 54 of the odd-numbered row are pulled up to a power supply voltage. Therefore, even if transistors 54 of the odd-numbered row are turned on, output lines OUT0–OUT31 will not be discharged to a ground voltage. In other words, memory cells 46 of the odd-numbered rows are masked and the pseudo largest Z value is detected from the Z values of memory cells 46 of even-numbered rows.

Thus, according to the fifth embodiment, a correct pseudo largest Z value can be detected even if data other than the Z value is stored in memory cells 46 of some row, because memory cells 46 can be masked per each row.

Industrial applicability

As can be seen from the foregoing, the semiconductor integrated circuit device according to the present invention is particularly useful as a frame buffer memory for a three-dimensional graphics system.

What is claimed is:

1. A semiconductor integrated circuit device comprising:
   a memory storing depth data for each pixel forming a three-dimensional graphics image; and
   a detection circuit detecting depth data representing a deepest point in said three-dimensional graphics image from depth data for a plurality of pixels stored in a predetermined region of said memory
   wherein said detection circuit includes a plurality of OR gates corresponding to a plurality of bits of depth data for said each pixel, for detecting a pseudo largest depth data as said depth data representing a deepest point, and said OR gate each receives a corresponding bit signal of depth data for said each pixel.

2. A The semiconductor integrated circuit device comprising:
   a memory storing depth data for each pixel forming a three-dimensional graphics image; and
   a detection circuit detecting depth data representing a deepest point in said three-dimensional graphics image from depth data for a plurality of pixels stored in a predetermined region of said memory;
   wherein the predetermined region of said memory includes a plurality of memory cells arranged in a plurality of rows corresponding to said plurality of pixels and a plurality of columns corresponding to a plurality of bits of depth data for said each pixel, and
   said detection circuit includes,
   a plurality of output lines arranged corresponding to said plurality of columns, and
   a plurality of transistors corresponding to said plurality of memory cells and arranged corresponding to said plurality of rows and said plurality of columns, each of said transistors is located adjacent to a corresponding memory cell and turned on/off in response to data stored in the memory cell, and each of the transistors arranged corresponding to a respective column has a conductive electrode connected to a corresponding output line.

3. A semiconductor integrated circuit device comprising:
   a memory storing depth data for each pixel forming a three-dimensional graphics image;
   a detection circuit detecting depth data representing a deepest point in said three-dimensional graphics image from depth data for a plurality of pixels stored in a predetermined region of said memory; and
   a mask circuit partially masking data stored in the predetermined region of said memory to preclude the data from an object of detection by said detection circuit,
   wherein the predetermined region of said memory includes a plurality of memory cells arranged in a plurality of rows corresponding to said plurality of pixels and a plurality of columns corresponding to a plurality of bits of depth data for said each pixel,
   said detection circuit includes,
   a plurality of output lines arranged corresponding to said plurality of columns, and
   a plurality of transistors corresponding to said plurality of memory cells and arranged corresponding to said plurality of rows and said plurality of columns, each of said transistors is located adjacent to a corresponding memory cell and turned on/off in response to data store in the memory cell, and each of the transistors arranged corresponding to a respective column has one conductive electrode connected to a corresponding output line, said mask circuit includes, a plurality of mask lines arranged corresponding to said plurality of rows, and a plurality of inverters corresponding to said plurality of mask lines and each supplying an output signal to a corresponding mask line in response to a mask signal, and each of transistors arranged corresponding to said each row has another conductive electrode connected to a corresponding mask line.

* * * * *